(12) United States Patent
Thomson et al.

(10) Patent No.: US 12,122,672 B2
(45) Date of Patent: Oct. 22, 2024

(54) METHODS FOR PREPARING HYDROGEN AND SOLID CARBON FROM A GASEOUS HYDROCARBON SOURCE USING MICROWAVES AND/OR RADIO WAVES

(71) Applicant: AURORA HYDROGEN INC., Edmonton (CA)

(72) Inventors: Murray Thomson, Toronto (CA); Erin Bobicki, Edmonton (CA)

(73) Assignee: AURORA HYDROGEN INC., Edmonton (CA)

(*) Notice: Subject to any disclaimer, the term of this patent is extended or adjusted under 35 U.S.C. 154(b) by 0 days.

(21) Appl. No.: 17/966,513

(22) Filed: Oct. 14, 2022

(65) Prior Publication Data

US 2023/0202839 A1 Jun. 29, 2023

Related U.S. Application Data

(63) Continuation of application No. PCT/CA2022/050710, filed on May 6, 2022.

(30) Foreign Application Priority Data

May 6, 2021 (SE) .................................. 21505763

(51) Int. Cl.
*C01B 3/24* (2006.01)
*C01B 32/05* (2017.01)
(Continued)

(52) U.S. Cl.
CPC ............... *C01B 3/24* (2013.01); *C01B 32/05* (2017.08); *C10B 19/00* (2013.01); *C10B 57/16* (2013.01);
(Continued)

(58) Field of Classification Search
None
See application file for complete search history.

(56) References Cited

U.S. PATENT DOCUMENTS 4,994,107 A * 2/1991 Flagan .................. C01B 21/068
423/349
6,670,058 B2 12/2003 Muradov
(Continued)

FOREIGN PATENT DOCUMENTS

KR 20050046358 A 5/2005
RU 2005-139640 A 9/2006
(Continued)

OTHER PUBLICATIONS

International Search Report and Written Opinion for corresponding PCT/CA2022/050710, mailed on Jul. 27, 2022, in 8 pages.
(Continued)

*Primary Examiner* — Paul A Wartalowicz
(74) *Attorney, Agent, or Firm* — Foley & Lardner LLP

(57) ABSTRACT

Provided are methods for preparing hydrogen and solid carbon. Illustrative methods comprise providing a feedstock comprising gaseous hydrocarbons to a microwave-inert reaction vessel and/or a radio wave-inert reaction vessel. The reaction vessel has solid carbon, about 0% water and about 0% molecular oxygen inside the reaction vessel and the carbon inside the reaction vessel is operable to heat the feedstock comprising gaseous hydrocarbons. The carbon is then exposed to microwaves and/or radio waves until the solid carbon is at a temperature of at least 1200 Kelvin, thereby forming hydrogen and solid carbon. Once formed, the hydrogen and solid carbon are separated.

20 Claims, 7 Drawing Sheets

(51) Int. Cl.
*C10B 19/00* (2006.01)
*C10B 57/16* (2006.01)

(52) U.S. Cl.
CPC .......... *C01B 2203/0272* (2013.01); *C01B 2203/049* (2013.01); *C01B 2203/06* (2013.01); *C01B 2203/0855* (2013.01); *C01B 2203/1241* (2013.01); *C01B 2203/1604* (2013.01); *C01B 2203/1614* (2013.01); *C01B 2203/80* (2013.01)

(56) References Cited

U.S. PATENT DOCUMENTS

| | | | |
|---|---|---|---|
| 6,783,632 | B2 | 8/2004 | Cha |
| 7,157,167 | B1 | 1/2007 | Muradov |
| 8,075,869 | B2 | 12/2011 | Zhu et al. |
| 8,147,765 | B2 | 4/2012 | Muradov et al. |
| 2008/0118421 | A1* | 5/2008 | Tranquilla ............... C22B 4/00 204/157.43 |
| 2009/0060805 | A1 | 3/2009 | Muradov et al. |
| 2016/0362351 | A1 | 12/2016 | Nagaki et al. |
| 2017/0170477 | A1* | 6/2017 | Sakshaug ............. C04B 41/009 |
| 2018/0099871 | A1 | 4/2018 | Tanner et al. |
| 2019/0046947 | A1 | 2/2019 | Strohm et al. |
| 2021/0047180 | A1* | 2/2021 | Hart ..................... B01J 8/12 |
| 2022/0022293 | A1* | 1/2022 | Latrasse ................ H05B 6/701 |
| 2024/0239652 | A1 | 7/2024 | Thomson et al. |

FOREIGN PATENT DOCUMENTS

| | | |
|---|---|---|
| RU | 2317943 C2 | 2/2008 |
| WO | 2009/113982 A1 | 9/2009 |

OTHER PUBLICATIONS

Abánades, et al., "Experimental analysis of direct thermal methane cracking", International Journal of Hydrogen Energy 36 (2011) 12877-12886.

Cooney, et al., "Production of Hydrogen from Methane/Steam in a Microwave Irradiated Char-Loaded Reactor", Fuel Science & Technology Int'l, 14 (8), 111-1141 (1996).

Domínguez, et al., "Microwave-assisted catalytic decomposition of methane of activated carbon for CO2-free hydrogen production", International Journal of Hydrogen Energy, 32 (2007), 4792-4799.

Lee, E. K., "Catalytic decomposition of methane over carbon blacks for CO2-free hydrogen production", Carobn 42 (2004) 2641-2648 (2004).

Suelves, I., et al.; "Carbonaceous materials as catalysts for decomposition of methane", Chemical Engineering Journal 140 (2008) 432-438, 2008.

* cited by examiner

METHODS FOR PREPARING HYDROGEN AND SOLID CARBON FROM A GASEOUS HYDROCARBON SOURCE USING MICROWAVES AND/OR RADIO WAVES

TECHNICAL FIELD

The present invention relates to pyrolytic chemistry and more particularly to hydrogen and solid carbon (i.e., solid elemental carbon) production from gaseous hydrocarbons.

BACKGROUND

The world is aiming to decarbonize transportation and industrial processes, and hydrogen has been identified as an energy carrier that has key advantages over electricity especially in applications where a chemical fuel is advantageous. Hydrogen plays a vital role in many industrial processes, with 70 million tons per year of hydrogen (2019) produced worldwide. At present (2021), hydrogen is primarily produced from fossil fuels by the steam reforming of natural gas, partial oxidation of methane, and coal gasification. These processes result in the production of carbon dioxide, a greenhouse gas (GHG). For example, the reaction of steam with methane is $CH_4 + 2 H_2O \rightarrow CO_2 + 4 H_2$. An alternative approach is to heat methane in the absence of oxygen and water (pyrolysis) to produce hydrogen and solid carbon with no direct $CO_2$ emissions.

Domínguez, et al. (A. Dominguez, B. Fidalgo, Y. Fernandez, J. J. Pis, J. A. Menéndez, "Microwave-assisted catalytic decomposition of methane of activated carbon for $CO_2$-free hydrogen production", International Journal of Hydrogen Energy, 32 (2007), 4792-4799) teaches combining microwave heating with the use of low-cost granular activated carbon as a catalyst for the production of $CO_2$-free hydrogen by methane decomposition in a fixed bed quartz-tube flow reactor. In order to compare the results achieved, conventional heating was also applied to the catalytic decomposition reaction of methane over the activated carbon. It was found that methane conversions were higher under microwave conditions than with conventional heating when the temperature measured was lower than or equal to 800° C. However, when the temperature was increased, the difference between the conversions under microwave and conventional heating was reduced. The influence of volumetric hourly space velocity (VHSV) on the conversion tests using both microwave and conventional heating was also studied. In general, there is a substantial initial conversion, which declines sharply during the first stages of the reaction but tends to stabilise with time. An increase in the VHSV has a negative effect on $CH_4$ conversion, and even more so in the case of microwave heating. Nevertheless, the conversions obtained in the microwave device at the beginning of the experiments are, in general, better than the conversions reported in other works which also use a carbonaceous-based catalyst. Additionally, the formation of carbon nanofibres in one of the microwave experiments is also reported.

Cooney, et al. (David O. Cooney and Zhenpeng Xi, "Production of Hydrogen from Methane/Steam in a Microwave Irradiated Char-Loaded Reactor", Fuel Science & Technology Int'l, 14 (8), 111-1141 (1996) teaches the production of hydrogen by the decomposition of pure methane and methane/steam mixtures in a microwave-irradiated fixed bed reactor packed with devolatilized coal char. Input power levels from 600-3500 W were used. Low conversions were obtained for pure methane as the feed, but 1:1 molar ratio mixtures of methane and steam gave high conversions. The effects of power level and feed flow rate were determined for the methane/steam case. Additionally, microwave heating and conventional heating were compared for the methane/steam case. Microwave heating was found to require temperatures 30-50° C. lower to give the same methane conversions obtained with conventional heating, over a conversion range of 18-53%. Thus, it may be concluded that microwave heating promotes the methane/steam reaction in some type of unique manner.

Abánades, et al. (A. Abánades, E. Ruiz, E. M. Ferruelo, F. Hernández, A. Cabanillas, J. M. Martínez-Val, J. A. Rubio, C. López, R. Gavela, G. Barrera, C. Rubbia, D. Salmieri, E. Rodilla, D. Gutiérrez, "Experimental analysis of direct thermal methane cracking", International Journal of Hydrogen Energy 36 (2011) 12877-12886) teaches that the analysis of the viability of Hydrogen production without $CO_2$ emissions is one of the most challenging activities that has been initiated for a sustainable energy supply. As one of the tracks to fulfil such objective, direct methane cracking has been analysed experimentally to assess the scientific viability and reaction characterization in a broad temperature range, from 875 to 1700° C. The effect of temperature, sweeping/carrier gas fraction proposed in some concepts, methane flow rate, residence time, and tube material and porosity has been analysed. The aggregation of carbon black particles to the reaction tube is the main technological show-stopper that has been identified.

SUMMARY

The present invention is based, at least in part, on providing a more efficient method for producing hydrogen and solid carbon from a gaseous hydrocarbon source. The present invention is also based, at least in part, on the identification of the role of carbon in pyrolytic decomposition of gaseous hydrocarbons and misunderstandings in the art therein.

In illustrative embodiments of the present invention, there is provided a method for preparing hydrogen and solid carbon, the method comprising, consisting essentially of, or consisting of: a) providing a feedstock comprising gaseous hydrocarbons to a reaction vessel, the reaction vessel having a starting solid carbon, about 0 wt % water and about 0 wt % molecular oxygen inside the reaction vessel and the carbon being operable to heat the feedstock comprising gaseous hydrocarbons; b) exposing the starting solid carbon to microwaves, radio waves, or a combination thereof until the starting solid carbon is at a temperature of at least 1200 Kelvin, thereby forming hydrogen and a prepared solid carbon; and c) separating the hydrogen from the starting solid carbon and the prepared solid carbon, wherein the reaction vessel is microwave inert if the starting solid carbon is exposed to microwaves and the reaction vessel is radio wave-inert if the starting solid carbon is exposed to radio waves.

In illustrative embodiments of the present invention, there is provided a method described herein wherein the reaction vessel comprises, consists essentially of, or consists of microwave transparent materials.

In illustrative embodiments of the present invention, there is provided a method described herein wherein the reaction vessel comprises, consists essentially of, or consists of microwave reflective materials.

In illustrative embodiments of the present invention, there is provided a method described herein wherein the reaction vessel comprises, consists essentially of, or consists of a radio wave transparent materials.

In illustrative embodiments of the present invention, there is provided a method described herein wherein the reaction vessel comprises, consists essentially of, or consists of radio wave reflective materials.

In illustrative embodiments of the present invention there is provided a method described herein wherein the reaction vessel is made from quartz and a high temperature metal alloy.

In illustrative embodiments of the present invention there is provided a method described herein wherein the feedstock is a gaseous feedstock.

In illustrative embodiments of the present invention there is provided a method described herein wherein the feedstock comprises gaseous hydrocarbons and is substantially devoid of non-hydrocarbon gases.

In illustrative embodiments of the present invention there is provided a method described herein wherein the feedstock is natural gas.

In illustrative embodiments of the present invention there is provided a method described herein wherein the solid carbon is solid carbon produced by pyrolysis of gaseous hydrocarbons. In illustrative embodiments of the present invention there is provided a method described herein wherein the prepared solid carbon is produced by pyrolysis of gaseous hydrocarbons.

In illustrative embodiments of the present invention there is provided a method described herein wherein the carbon is at a temperature in the range of from 1200 Kelvin to about 2000 Kelvin. In illustrative embodiments of the present invention there is provided a method described herein wherein the starting solid carbon is at a temperature in the range of from 1200 Kelvin to about 2000 Kelvin.

In illustrative embodiments of the present invention there is provided a method described herein wherein the carbon is at a temperature in the range of from about 1300 Kelvin to about 1900 Kelvin. In illustrative embodiments of the present invention there is provided a method described herein wherein the starting solid carbon is at a temperature in the range of from about 1300 Kelvin to about 1900 Kelvin.

In illustrative embodiments of the present invention there is provided a method described herein wherein the carbon is at a temperature in the range of from about 1400 Kelvin to about 1800 Kelvin. In illustrative embodiments of the present invention there is provided a method described herein wherein the starting solid carbon is at a temperature in the range of from about 1400 Kelvin to about 1800 Kelvin.

In illustrative embodiments of the present invention there is provided a method described herein wherein the carbon is at a temperature in the range of from about 1500 Kelvin to about 1700 Kelvin. In illustrative embodiments of the present invention there is provided a method described herein wherein the starting solid carbon is at a temperature in the range of from about 1500 Kelvin to about 1700 Kelvin.

In illustrative embodiments of the present invention there is provided a method described herein wherein the carbon is at a temperature of about 1600 Kelvin. In illustrative embodiments of the present invention there is provided a method described herein wherein the starting solid carbon is at a temperature of about 1600 Kelvin.

In illustrative embodiments of the present invention, there is provided a method described herein wherein the starting solid carbon is exposed to microwaves.

In illustrative embodiments of the present invention, there is provided a method described herein wherein the starting solid carbon is exposed to radio waves.

In illustrative embodiments of the present invention, there is provided a method described herein wherein the hydrogen and the prepared solid carbon are produced in the absence of plasma formation by the microwaves, radio waves, or a combination thereof.

In illustrative embodiments of the present invention, there is provided a method described herein wherein the starting solid carbon is free of metal impurities and oxygen-containing species.

In illustrative embodiments of the present invention, there is provided a method described herein wherein the hydrogen and the prepared solid carbon are formed without substantial formation of carbon monoxide.

In illustrative embodiments of the present invention there is provided a method for preparing hydrogen and solid carbon, the method comprising: a) providing a feedstock comprising gaseous hydrocarbons to a microwave-inert reaction vessel, the reaction vessel having solid carbon, about 0% water and about 0% oxygen inside the reaction vessel and the carbon being operable to heat the feedstock comprising gaseous hydrocarbons; b) exposing the carbon to microwaves until the solid carbon is at a temperature of at least 1200 Kelvin, thereby forming hydrogen and solid carbon; and c) separating the hydrogen and solid carbon.

In illustrative embodiments of the present invention there is provided a method described herein wherein the microwave-inert reaction vessel comprises microwave transparent materials.

In illustrative embodiments of the present invention there is provided a method described herein wherein the microwave-inert reaction vessel comprises microwave reflective materials.

In illustrative embodiments of the present invention there is provided a method described herein wherein the microwave-inert reaction vessel comprises a mixture of microwave transparent and microwave reflective materials.

In illustrative embodiments of the present invention there is provided a method described herein wherein the reaction vessel is made from quartz and a high temperature metal alloy.

In illustrative embodiments of the present invention there is provided a method described herein wherein the feedstock is natural gas.

In illustrative embodiments of the present invention there is provided a method described herein wherein the solid carbon is solid carbon produced by pyrolysis of gaseous hydrocarbons.

In illustrative embodiments of the present invention there is provided a method described herein wherein the carbon is at a temperature in the range of from 1200 Kelvin to about 2000 Kelvin.

In illustrative embodiments of the present invention there is provided a method described herein wherein the carbon is at a temperature in the range of from about 1300 Kelvin to about 1900 Kelvin.

In illustrative embodiments of the present invention there is provided a method described herein wherein the carbon is at a temperature in the range of from about 1400 Kelvin to about 1800 Kelvin.

In illustrative embodiments of the present invention there is provided a method described herein wherein the carbon is at a temperature in the range of from about 1500 Kelvin to about 1700 Kelvin.

In illustrative embodiments of the present invention there is provided a method described herein wherein the carbon is at a temperature of about 1600 Kelvin.

In illustrative embodiments of the present invention there is provided a method for preparing hydrogen and solid carbon, the method comprising: a) providing a feedstock comprising gaseous hydrocarbons to a reaction vessel, the reaction vessel having a starting solid carbon, about 0 wt % water and about 0 wt % molecular oxygen inside the reaction vessel and the starting solid carbon being operable to heat the feedstock comprising gaseous hydrocarbons; b) exposing the starting solid carbon to microwaves, radio waves, or a combination thereof until the starting solid carbon is at a temperature of at least 1200 Kelvin, thereby forming hydrogen and a prepared solid carbon; and c) separating the hydrogen and the prepared solid carbon, wherein the reaction vessel is microwave inert if the starting solid carbon is exposed to microwaves and the reaction vessel is radio wave-inert if the starting solid carbon is exposed to radio waves.

In illustrative embodiments there is provided a method described herein wherein the reaction vessel comprises microwave transparent materials.

In illustrative embodiments there is provided a method described herein wherein the reaction vessel comprises microwave reflective materials.

In illustrative embodiments there is provided a method described herein wherein the reaction vessel comprises a radio wave transparent materials.

In illustrative embodiments there is provided a method described herein wherein the reaction vessel comprises radio wave reflective materials.

In illustrative embodiments there is provided a method described herein wherein the reaction vessel is made from quartz and a high temperature metal alloy.

In illustrative embodiments there is provided a method described herein wherein the feedstock is natural gas.

In illustrative embodiments there is provided a method described herein wherein the feedstock is a gaseous feedstock.

In illustrative embodiments there is provided a method described herein wherein the feedstock is substantially devoid of non-hydrocarbon gases.

In illustrative embodiments there is provided a method described herein wherein the feedstock contains about 0 wt % of an inert gas.

In illustrative embodiments there is provided a method described herein wherein the feedstock consists essentially of gaseous hydrocarbons.

In illustrative embodiments there is provided a method described herein wherein the prepared solid carbon is solid carbon produced by pyrolysis of gaseous hydrocarbons.

In illustrative embodiments there is provided a method described herein wherein the starting solid carbon is at a temperature in the range of from 1200 Kelvin to about 2000 Kelvin or the starting solid carbon and the prepared solid carbon is at a temperature range of from 1200 Kelvin to about 2000 Kelvin.

In illustrative embodiments there is provided a method described herein wherein the starting solid carbon is at a temperature in the range of from about 1300 Kelvin to about 1900 Kelvin or the starting solid carbon and the prepared solid carbon is at a temperature in the range of from about 1300 Kelvin to about 1900 Kelvin.

In illustrative embodiments there is provided a method described herein wherein the starting solid carbon is at a temperature in the range of from about 1400 Kelvin to about 1800 Kelvin or the starting solid carbon and the prepared solid carbon is at a temperature in the range of from about 1400 Kelvin to about 1800 Kelvin.

In illustrative embodiments there is provided a method described herein wherein the starting solid carbon is at a temperature in the range of from about 1500 Kelvin to about 1700 Kelvin or the starting solid carbon and the prepared solid carbon is at a temperature in the range of from about 1500 Kelvin to about 1700 Kelvin.

In illustrative embodiments there is provided a method described herein wherein the starting solid carbon is at a temperature of about 1600 Kelvin or the starting solid carbon and the prepared solid carbon is at a temperature of about 1600 Kelvin.

In illustrative embodiments there is provided a method described herein wherein the starting solid carbon is exposed to microwaves or the starting solid carbon and prepared solid carbon are exposed to microwaves.

In illustrative embodiments there is provided a method described herein wherein the starting solid carbon is exposed to radio waves or the starting solid carbon and prepared solid carbon are exposed to radio waves.

In illustrative embodiments there is provided a method described herein wherein the method does not use a catalyst.

In illustrative embodiments there is provided a method described herein wherein the hydrogen and the prepared solid carbon are produced in the absence of plasma formation by the microwaves, radio waves, or a combination thereof.

In illustrative embodiments there is provided a method described herein wherein the starting solid carbon is free of metal impurities and oxygen-containing species.

In illustrative embodiments there is provided a method described herein wherein the hydrogen and the prepared solid carbon are formed without substantial formation of carbon monoxide.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
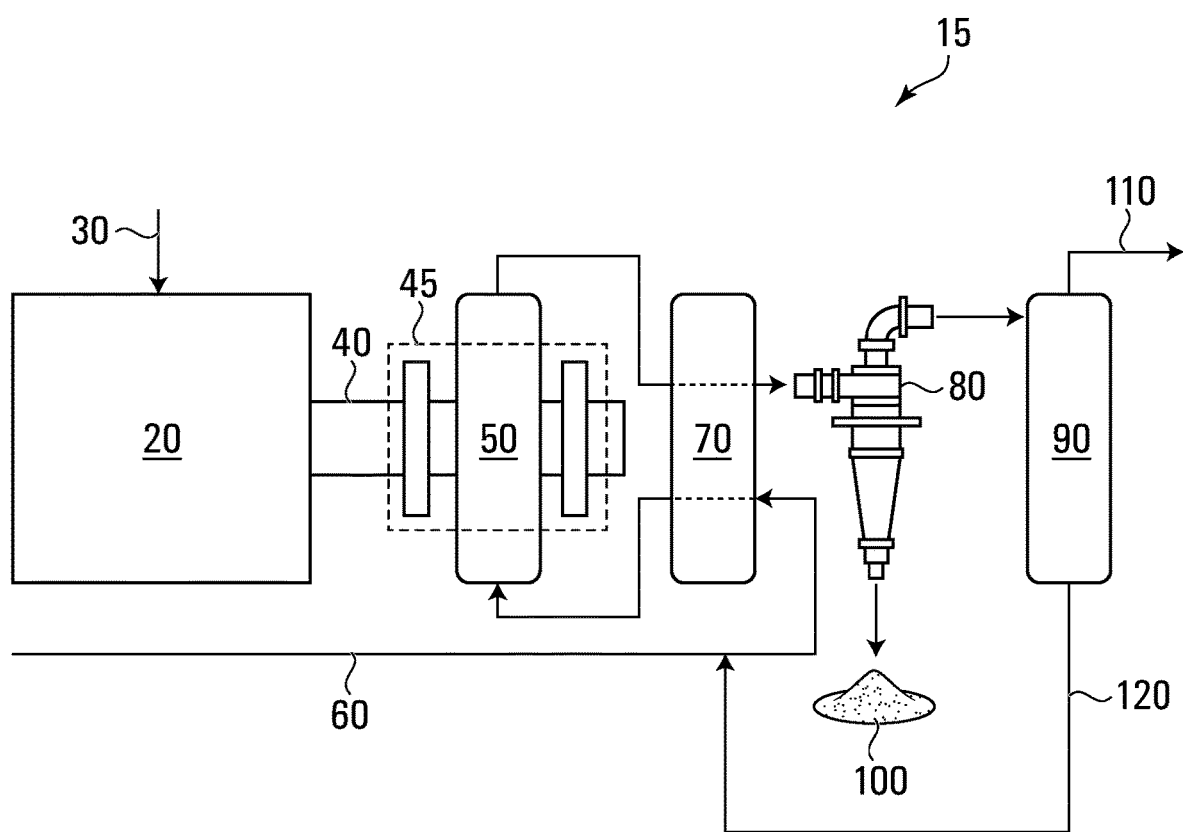
FIG. 1: Pyrolysis process to produce hydrogen from natural gas in a high purity configuration.

As used herein, the term "feedstock" refers to a source of hydrocarbons that is gaseous or can be evaporated. The methods of the present invention use a gaseous feedstock. The feedstock may comprise gaseous hydrocarbons and be substantially devoid of non-hydrocarbon gas (such as, but not limited to, carbon dioxide, nitrogen, argon, or any combination thereof). The feedstock being "substantially devoid of non-hydrocarbon gas" refers to the feedstock having less than 10 wt % of non-hydrocarbon gas, and including less than 9, 8, 7, 6, 5, 4, 3, 2, or 1 wt % of non-hydrocarbon gas. Accordingly, the feedstock may comprise more than 90, 91, 92, 93, 94, 95, 96, 97, 98, or 99 wt % gaseous hydrocarbons. The feedstock may consist essentially of or consist of gaseous hydrocarbons. The feedstock may comprise gaseous hydrocarbons and be substantially devoid of carbon dioxide. The feedstock being "substantially devoid of carbon dioxide" refers to the feedstock having less than 10 wt % of carbon dioxide, and including less than 9, 8, 7, 6, 5, 4, 3, 2, or 1 wt % of carbon dioxide. Preferably the feedstock is natural gas. Natural gas often contains a mixture of gasses, gaseous hydrocarbons (including methane), carbon dioxide, nitrogen, hydrogen, water, and molecular oxygen. Preferred feedstocks have lower amounts of carbon dioxide and ideally have negligible water and molecular oxygen, or preferably 0 wt % water and 0 wt % molecular oxygen. Feedstocks having less than 1.5 wt % water are preferred for use in methods of the present invention. More preferably, feedstocks having 1 wt % water or less are used in methods of the present invention. More preferably, feedstocks having 0.5 wt % water or less are used in methods of the present invention. More preferably, feedstocks having 0.1 wt % water or less are used in methods of the present invention. Feedstocks having more than 2 wt % water are not suitable for use in the present invention. Further, feedstocks having 1.5 wt % or less of molecular oxygen are preferred for use in methods of the present invention. More preferably, feedstocks having 1 wt % or less of molecular oxygen are used in methods of the present invention. More preferably, feedstocks having 0.5 wt % or less of molecular oxygen are used in methods of the present invention. More preferably, feedstocks having 0.1 wt % or less of molecular oxygen are used in methods of the present invention. Feedstocks having more than 2 wt % molecular oxygen are not suitable for use in the present invention. Further, feedstocks having less than 10 wt % oxygen-containing species are preferred for use in methods of the present invention. More preferably, feedstocks having 5 wt % or less of oxygen-containing species are used in methods of the present invention. More preferably, feedstocks having 2 wt % or less oxygen-containing species are used in methods of the present invention. Feedstocks having more than 10 wt % oxygen-containing species are not suitable for use in the present invention. Feedstocks of pure gaseous hydrocarbons or a pure mixture of gaseous hydrocarbons may also be used in methods of the present invention. In some preferred embodiments, the feedstock is free from carbon dioxide. In some preferred embodiments, the feedstock is free from inert gases. In some preferred embodiments, the feedstock is free from nitrogen. In some preferred embodiments, feedstocks of the present invention consist of and/or consist essentially of gaseous hydrocarbons.

As used herein, the term "%" or "wt %" refers to the percentage by weight, unless the context makes clear that another meaning is applicable. For example, when referring to a composition (e.g. a feedstock) having less than 1.5% water, this means that the total weight of the composition comprises 1.5% by weight or less of water.

As used herein, the term "water" refers to the molecule $H_2O$.

As used herein, the term "oxygen-containing species" refers to a molecule that comprises at least one oxygen atom, which molecule is not molecular oxygen or water.

As used herein, the term "oxygen" normally refers to the molecule $O_2$, often referred to as "molecular oxygen". In some contexts, the term "oxygen" will refer to all of the oxygen atoms in a particular composition. For example, when referring to oxygen-containing species, the amount of oxygen is the total amount of the oxygen atoms in molecules, that are not molecular oxygen or water, that contain an oxygen atom.

As used herein, the term "inert gas" refers to a gas that does not undergo a chemical reaction or a chemical change under the conditions inside the reaction vessel. Non-limiting examples of inert gasses include, but are not limited to nitrogen, helium, neon, argon, krypton, xenon, and radon.

As used herein, the term "reaction vessel" refers to a body defining an enclosed, inside space of the reaction vessel that is used to contain solid carbon, gaseous hydrocarbons and hydrogen, which are involved in methods of preparing hydrogen and solid carbon. Reaction vessels suitable for use in the present invention must be able to prevent water and molecular oxygen from entering the reaction vessel and must be able to withstand temperatures in excess of 1200 Kelvin or more. Furthermore, reaction vessels of the present invention must also be able to accept microwaves and/or radio waves in and be able to permit microwaves and/or radio waves to enter the inside space of the reaction vessel. For example, it is possible for the reaction vessel to have a portion of the vessel, such as a space or gap or a piece of microwave and/or radio wave transparent material such that microwaves and/or radio waves may enter the vessel at that portion, while the remainder of the vessel is microwave and/or radio wave reflective. The reflection portions of the vessel are suitable for containing the waves inside the vessel. Examples of suitable reactions vessels include, but are not limited to, pyrolysis reactors of the form: moving bed reactor, bubbling fluidized bed reactor, spouted fluidized bed reactor, transported bed reactor, circulating fluidized bed reactor, ultra-rapid reactor, rotating cone reactor, ablative plate reactor, vacuum reactor, auger/screw reactor, cyclone/vortex reactor, centrifuge reactor, flow reactor. A preferred reaction vessel is a pyrolysis reactor.

As used herein, the term "microwave" refers to an electromagnetic wave having a wavelength in the range of 0.001 to 1 meters with corresponding frequencies of 300 GHz and 300 MHz. Common frequency bands for microwave heating include a frequency at or around 915 MHz and a frequency at or around 2450 MHz, though other frequencies may be used in methods of the present invention, such as any frequency of 300 GHz or less. Microwave heating in dielectric materials, of concern in the present invention, occurs by two primary mechanisms: dipole rotation and ionic conduction. Microwave heating is non-contact, rapid, selective, volumetric, and involves quick start-up and shut down.

As used herein, the term "radio wave" refers to an electromagnetic wave having a frequency of less than 300 MHz. Often, radio waves have a wavelength in the range of 300,000 to 1 meters with corresponding frequencies of 1 KHz and 300 MHz. Common frequency bands for radio wave heating include a frequency at or around 20 KHz, though other frequencies may be used in methods of the present invention, such as about 1 KHz to about 200 MHz, about 1 KHz to about 100 MHz, about 1 KHz to about 50 MHz, about 1 KHz to about 1 MHz, about 1 KHz to about 100 KHz, about 1 KHz to about 50 KHz, about 1 KHz to about 20 KHz, and about 1 MHz to about 10 KHz. Radio wave heating is non-contact, rapid, selective, volumetric, and involves quick start-up and shut down. Plasma is not formed under the conditions of the heating by microwaves and/or radio waves according to the exemplary embodiments.

Both microwaves and radio waves may be used to heat solid carbon (e.g., the starting solid carbon) according to the present invention. In some preferred embodiments, only microwaves are used to heat the solid carbon (e.g., the starting solid carbon). In other preferred embodiments, only radio waves are used to heat the solid carbon (e.g., the starting solid carbon). In still other embodiments, both microwaves and radio waves are used to heat the solid carbon (e.g., the starting solid carbon). Frequency ranges for suitable waves according to the present invention may have a range of less than about 300 GHz, often from about 3 kHz to about 300 GHz, having corresponding wavelengths of about 100 Km to about 1 mm. In some preferred embodiments, the frequency range for suitable waves according to the present invention may be a range of from about 300 kHz to about 30 GHz having corresponding wavelengths of about 1 Km to about 10 mm. In some preferred embodiments, the frequency range for suitable waves according to the present invention may be a range of from about 300 MHz to about 3 GHz having corresponding wavelengths of about 1 m to about 100 mm. In some preferred embodiments, the frequency range for suitable waves according to the present invention may be a range of from about 3 MHz to about 30 MHz having corresponding wavelengths of about 10 m to about 100 m. In some preferred embodiments, the frequency of suitable waves according to the present invention may be 915 MHz, 2450 MHz, 20 KHz, or any combination thereof.

The heating rate of a dielectric material (dT/dt) in response to microwave and/or radio wave exposure is a function of the power density ($P_d$, W/m³), specific heat capacity of a material ($c_p$, J/kg° C.), and the material density ($\rho$, kg/m³) (Equation 1). The power density is, in turn, a function of the frequency (f, Hz), the permittivity of free space ($\varepsilon_0$, 8.854×10$^{-12}$ F/m), the relative imaginary permittivity ($\varepsilon_r''$), and the electric field intensity (E, V/m) (Equation 2). The imaginary permittivity determines how well a material can turn microwave and/or radio wave energy into heat and is a critical parameter to know in the design of microwave and/or radio wave heating systems. Equation 2 shows power density is a function of the square of the electric field intensity. Since the heating rate is a function of the power density, the heating rate of a material increases exponentially with increasing electric field intensity.

The half power depth ($D_p$, Equation 3) determines how well microwaves and/or radio waves can penetrate into and, thus, heat a material. The half power depth is a function of the microwave and/or radio wave wavelength ($\lambda_0$), the relative real permittivity ($\varepsilon_r'$), and the imaginary permittivity. The real permittivity is a measure of the ability of a material to couple with the microwave and/or radio wave field. Thus, both the real and imaginary permittivity of a material (which together, make up the complex permittivity, Equation 4, where $j=\sqrt{-1}$ are important to understand in the design of microwave and/or radio wave heating systems.

$$\frac{dT}{dt} = \frac{P_d}{c_p \rho} \quad (1)$$

$$P_d = 2\pi f \varepsilon_0 \varepsilon_r'' E^2 \quad (2)$$

$$D_p = \frac{\lambda_0}{2\pi(2\varepsilon_r')^{\frac{1}{2}}} \left\{ \sqrt{\left[1 + \left(\frac{\varepsilon_r''}{\varepsilon_r'}\right)^2\right]} - 1 \right\}^{-\frac{1}{2}} \quad (3)$$

$$\varepsilon(T) = \varepsilon'(T) - j\varepsilon''(T) \quad (4)$$

As used herein, the term "microwave-inert" refers to a property of a material that results in the material being unaffected by its interaction with a microwave. In some instances, a microwave-inert material is a material that is transparent to microwaves and allows a microwave to pass through the material. In other instances, a microwave-inert material is a material that reflects microwaves and causes a microwave to change direction upon interaction between the microwave and the material and does not permit the microwave to pass through the material.

As used herein, the term "radio wave-inert" refers to a property of a material that results in the material being unaffected by its interaction with a radio wave. In some instances, a radio wave-inert material is a material that is transparent to radio waves and allows a radio wave to pass through the material. In other instances, a radio wave-inert material is a material that reflects radio waves and causes a radio wave to change direction upon interaction between the radio wave and the material and does not permit the radio wave to pass through the material.

As used herein the term "about" means that precise adherence to the exact numerical value following the term "about" is not absolutely required or essential and that some minor deviation from the exact value is permissible. In many circumstances a deviation of ±10% is acceptable. In preferred circumstances a deviation of ±5% is acceptable. In still other preferred circumstances a deviation of ±1% is acceptable. In still other preferred circumstances a deviation of ±0.1% is acceptable.

In illustrative embodiments, there is provided a method for preparing hydrogen and solid carbon. Reducing and/or preventing $CO_2$ and other greenhouse gases (GHG's) is an advantage of methods of the exemplary embodiments. Production of solid carbon is desirable because it both contributes to the reaction and means that the carbon is being captured in a non-gaseous and non-GHG form. The method comprises providing a feedstock to a microwave-inert reaction vessel or providing a feedstock to a radio wave-inert reaction vessel or providing feedstock to a reaction vessel that is both microwave-inert and radio wave-inert. Inside the vessel there is solid carbon, an absence, or negligible amount at most, of water and an absence, or negligible amount at most, of molecular oxygen. Water and molecular oxygen are not added to the reaction vessel. The only source of water and molecular oxygen inside the reaction vessel should be the small amounts of water, molecular oxygen and oxygen-containing species (e.g. $CO_2$) found in the feedstock. The solid carbon is then exposed to microwaves, radio waves, or both microwaves and radio waves so that the carbon is at a temperature of at least 1200 Kelvin. The hot carbon then heats the gaseous hydrocarbons, thereby forming hydrogen and additional solid carbon (e.g. prepared solid carbon), followed by separating the hydrogen and starting and prepared solid carbon. Carbon monoxide is not substantially formed during formation of the hydrogen and the solid carbon. In some embodiments, less than 10 wt % of the feedstock is converted to carbon monoxide using the methods of the exemplary embodiments. In some preferred embodiments, less than 5 wt % of the feedstock is converted to carbon monoxide using the methods of the exemplary embodiments. In some other preferred embodiment, less than 4 wt % of the feedstock is converted to carbon monoxide using methods of the exemplary embodiments. In some other preferred embodiment, less than 3 wt % of the feedstock is converted to carbon monoxide using methods of the exemplary embodiments. In some other preferred embodiment, less than 2 wt % of the feedstock is converted to carbon monoxide using methods of the exemplary embodiments. In some other preferred embodiment, less than 1 wt % of the feedstock is converted to carbon monoxide using methods of the exemplary embodiments. In some other preferred embodiment, about 0 wt % of the feedstock is converted to carbon monoxide using methods of the exemplary embodiments. It is possible to expose the solid carbon to microwaves, radio waves, or both microwaves and radio waves prior to providing the feedstock to the reaction vessel or after the feedstock is provided to the reaction vessel. It is also possible to run this process continuously, without having to stop the process for addition of more feedstock and/or removal of hydrogen and/or solid carbon. Alternatively, the process can be stopped to remove solid carbon and/or other components.

Methods of the present invention provide for a catalyst-free system. In some embodiments, methods of the present invention also or alternatively comprise reactions in which the solid carbon initially in the reaction vessel is substantially free of metal impurities. Further and/or alternatively, methods of the present invention are substantially and/or completely plasma-free reactions. Further and/or alternatively, in some preferred embodiments, carbon monoxide is not formed and/or is substantially not formed by reactions of the present invention.

The methods of the exemplary embodiments use a microwave-inert reaction vessel, radio wave-inert reaction vessel, or reaction vessel that is both microwave-inert and radio wave-inert. This means that the material the reaction vessel is made from is one of: a) microwave transparent and/or microwave reflective; b) radio wave transparent and/or radio wave reflective; and c) both microwave transparent and radio wave transparent and/or microwave reflective and radio wave reflective. Microwave transparent materials and radio wave transparent materials are materials that generally have low values of $\varepsilon_r'$ and $\varepsilon_r''$. Examples of such materials include, but are not limited to, polytetrafluoroethylene (PTFE), alumina-based ceramics, corundum, fused quartz and borosilicate glass, boron nitride, silicon nitride, aluminum nitride etc. Microwave reflective materials and radio wave reflective materials are materials that generally have high values of $\varepsilon_r'$ and $\varepsilon_r''$ and are highly conductive, resulting in low penetration depth. Examples include metals and metal alloys such as stainless steel, carbon steel, brass, bronze, iron, copper, silver, gold, aluminum, zinc, lead, chromium, manganese, titanium, molybdenum, tungsten, etc. Preferred materials from which the reaction vessel may be made include quartz, stainless steel and high temperature refractory metal alloys.

Solid carbon is produced as a product of methods of the exemplary embodiments and the formed carbon will preferentially deposit on materials that are hot. If the reaction vessel is made from a material that is likely to be heated by microwaves and/or radio waves, or if the reaction vessel contains non-carbonaceous material that is likely to be heated by microwaves and or/radio waves, then it is possible that the reactor will become fouled, resulting in the slowing of the reaction, ultimately yielding less solid carbon and hydrogen products. In other words, different materials respond to microwaves and/or radio waves differently, and in methods of the exemplary embodiments it is preferred that the solid carbon that is initially in the reaction vessel (e.g. the starting carbon) is the primary microwave and/or radio wave susceptor. This is particularly important if the method is to run continuously without stopping. In this regard, while any solid carbon may be used as a source of solid carbon initially present in the reaction vessel (e.g. starting carbon), purer forms of solid carbon are preferred. Examples of preferred solid carbon sources are solid carbon formed from the gas phase such as carbon black or graphitic carbon rather than carbon formed from organic solids such as activated carbon, coal char or biochar. Most preferred is carbon black, which will be generated by methods of the exemplary embodiments when the feedstock is a gaseous hydrocarbon, such as natural gas. The solid carbon is free of metal impurities and oxygen-containing species.

Natural gas is a common source of gaseous hydrocarbons and is a suitable source of gaseous hydrocarbons for methods of the exemplary embodiments. The feedstock could also be sourced from wastewater treatment, solid waste landfills, anerobic digestion and other fossil fuel sources. Pure feedstocks of gaseous hydrocarbons, such a methane, or pure mixtures of gaseous hydrocarbons are also suitable feedstocks for methods of the exemplary embodiments.

If impurities (e.g. metals) in the solid carbon are relied upon to drive the reaction, as the reaction proceeds the newly formed solid carbon will deposit on the impurities, thereby shielding the reacting gas from the impurities which act as a catalytic site, thereby preventing the catalytic reaction from occurring resulting in a slowing and/or halt to the reaction. If impurities such as water or molecular oxygen present in the solid carbon are relied upon to drive the conversion to hydrogen, then pyrolysis does not occur and $CO_2$ is a product of the reaction. This occurs because once the oxygen and/or water are driven off the solid carbon, the reaction slows or stops. Furthermore, impurities (e.g. sulfur) in the feedstock can lead to the degradation of catalytic properties if catalysis is being relied upon to drive the reaction at low temperature. Methods of the exemplary embodiments do not rely upon catalytic properties, though any catalytic effect solid carbon may have is not negated (and also not required) by the pyrolytic reactions of the exemplary embodiments.

Methane decomposition into hydrogen and solid carbon will occur at temperatures higher than about 1100 Kelvin, but only with any significant yield at temperatures higher than about 1200 Kelvin. As the temperature increases, so the yield of hydrogen and solid carbon increases until about 1600 Kelvin when almost all of the methane will decompose into hydrogen and solid carbon. Methods of the exemplary embodiments may operate at a temperature of 1200 Kelvin or higher. Preferably, methods of the exemplary embodiments may operate at a temperature in the range of from about 1200 Kelvin to about 2000 Kelvin. Preferably, methods of the exemplary embodiments may operate at a temperature in the range of from about 1300 Kelvin to about 1900 Kelvin. Preferably, methods of the exemplary embodiments may operate at a temperature in the range of from about 1400 Kelvin to about 1800 Kelvin. Preferably, methods of the exemplary embodiments may operate at a temperature in the range of from about 1500 Kelvin to about 1700 Kelvin. Most preferably, methods of the exemplary embodiments may operate at a temperature of about 1600 Kelvin.

Figure 2:
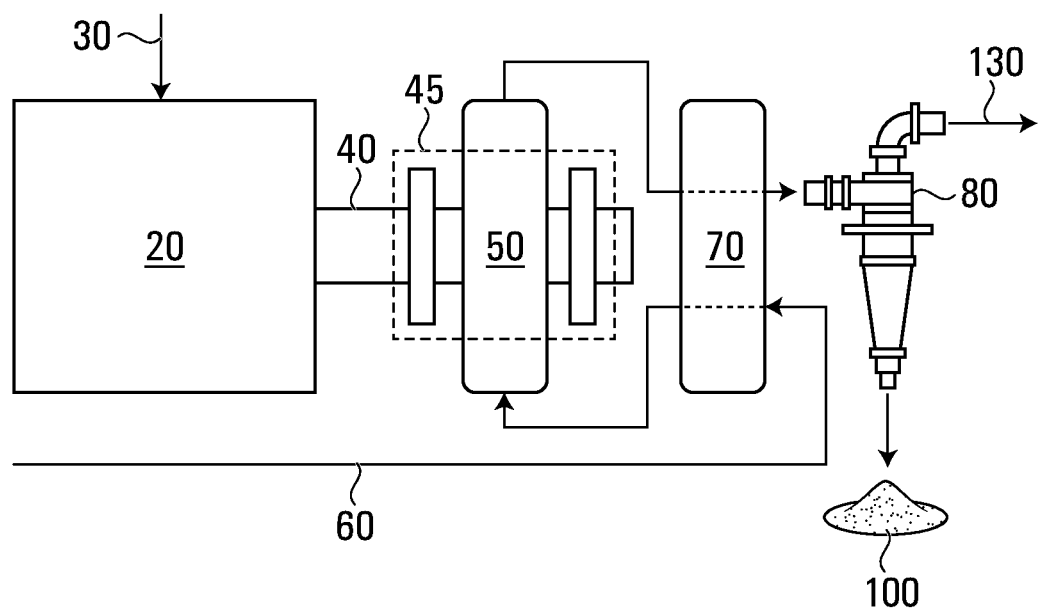
FIG. 2: Pyrolysis process to produce hydrogen from natural gas in a less than high purity configuration.

Referring to FIG. 1, illustrative embodiments of methods of the exemplary embodiments may be carried out using a system shown generally at 15. A microwave and/or radio wave generator 20 is provided with electricity from an electricity source 30. A waveguide 40 together with an applicator 45, introduce microwaves and/or radio waves to a reaction vessel 50, the reaction vessel 50 having solid carbon inside. A feedstock source 60 introduces feedstock (e.g. natural gas) to a heat exchanger 70, which then introduces the feedstock to the reaction vessel 50. Pyrolysis of the feedstock (e.g. methane from natural gas) occurs in the reaction vessel 50 upon the solid carbon in the reaction vessel 50 being heated to at least 1200 Kelvin and the hot solid carbon then heating the feedstock. Once decomposed, the resulting hydrogen and solid carbon are then introduced to the heat exchanger 70 where the heat of the hydrogen and solid carbon are reduced and transferred to the feedstock about to enter the reaction vessel 50. From the heat exchanger 70, the cooled hydrogen and solid carbon are then introduced to a particle separator 80 where the hydrogen and solid carbon are separated. The particle separator 80 has two outflows, one outflow 100 for solid carbon and the other for hydrogen. The solid carbon, having exited the particle separator 80, is collected. The hydrogen exiting the particle separator 80 is introduced to a hydrogen separator 90 which separates the hydrogen from residual gas from the feedstock. The hydrogen separator 90 has two outflows, one outflow 110 for hydrogen and one outflow 120 for residual gas. The hydrogen, having exited the hydrogen separator 90, is collected. The residual gas exiting the hydrogen separator 80 may then be reintroduced in the heat exchanger 70 for return to the reaction vessel 50. An alternative configuration exists where the residual gas does not need to be recycled to the heat exchanger 70 or reaction vessel 50. In such cases it is possible to collect the residual gas together with the hydrogen, in which case the hydrogen separator 90 may be omitted from the process, as illustrated in FIG. 2, and outflow 110, as shown in FIG. 1, is instead an outflow 130 comprising both hydrogen and residual gas, as shown in FIG. 2. Alternatively, the residual gas can simply be collected separately from the hydrogen and not recycled to the heat exchanger 70 and reaction vessel 50.

EXAMPLES

The following examples are illustrative of some of the embodiments of the exemplary embodiments described herein. These examples do not limit the spirit or scope of the exemplary embodiments in any way.

Example 1: Energy and Mass Flow Calculations

The energy and mass flow calculations are based on a detailed chemical model of the methane pyrolysis and carbon particle formation. This model provides the reactor temperature and unreacted methane at the outlet of the pyrolysis reactor for a given reactor pressure and residence time. The chemical and thermal energy per unit mass at the inlet and outlet of the pyrolysis reactor is calculated. Knowing the available microwave energy, the amount of mass flowing through the reactor taking into account the recycling of the unreacted methane can be calculated. This allows a calculation of the production rate of hydrogen formed.
Pyrolysis Modeling:

A validated and peer-reviewed model (NanoPFR) includes a detailed gas phase chemistry (180 species, and 1237 reactions) that describes the pyrolysis of methane and the formation of larger hydrocarbons up to 5 ring PAH species (Naseri, A., Thomson, M. J. (2019) Development of a numerical model to simulate carbon black synthesis and predict the aggregate structure in flow reactors. Combustion and Flame, 207:314-326). An aerosol dynamics model represents the particle size distribution using a sectional model (25 sections). Included are models of particle inception from PAH, particle growth from $C_2H_2$ and PAH, and particle agglomeration. The reactor was represented as a plug flow reactor. The input species include non-methane species present in pipeline natural gas (94.7% $CH_4$, 4.2% $C_2H_6$, 0.5% $N_2$, 0.3% $CO_2$, 0.2% $C_3H_8$ (by moles). The reactor is modeled as a constant temperature, constant pressure process.

Figure 3:
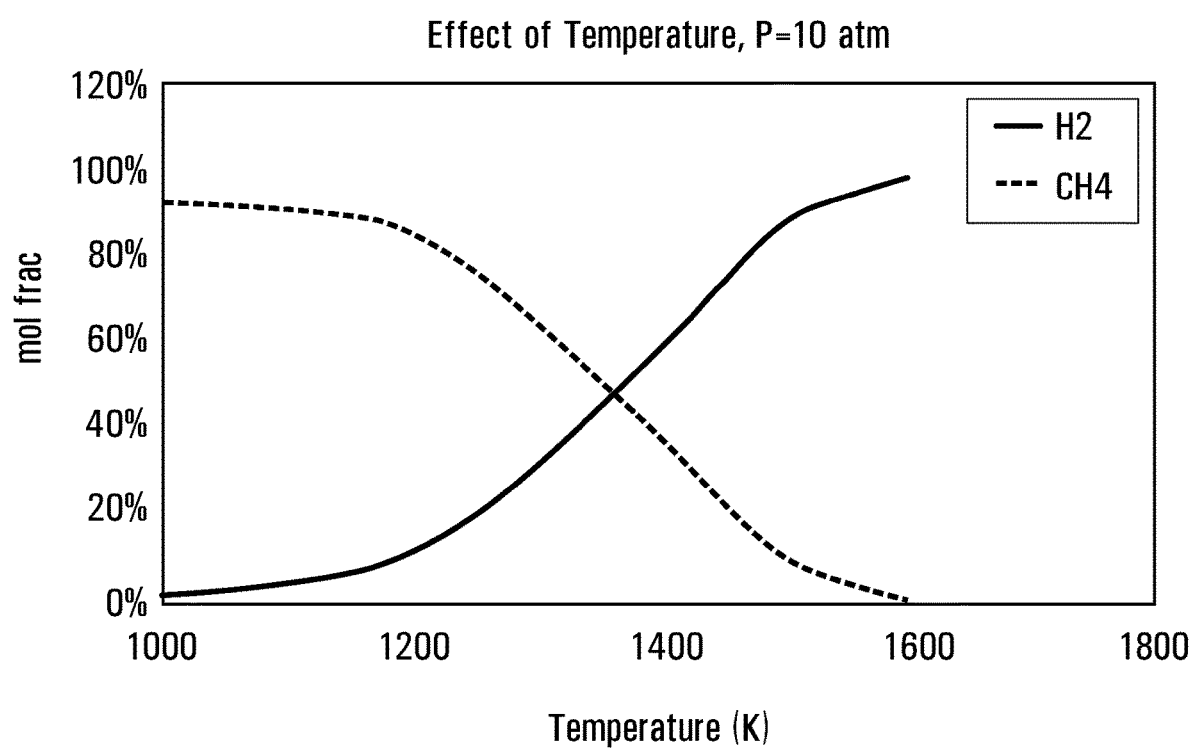
FIG. 3: Graph shoring the effect of temperature for the reactor at 10 atm and 10 sec.

The model provides the outlet mole fractions of 180 gas-phase species and solid carbon volume fraction as a function of pyrolysis reactor pressure, temperature, and residence time. FIG. 3 presents the outlet mole fractions of methane and hydrogen as a function of the reactor temperature at reactor pressure of 10 atm and a residence time of 10 sec. The results show that the methane starts to significantly react at 1200K and by 1600K it is mostly absent from the products. Hydrogen shows the mirror image of methane and peaks at 1600K. This shows that there is a trade-off of temperature and residual methane. A 1600K reactor temperature was chosen for the energy and mass analysis.

Table 1 shows details of the inlet and outlet mole fractions at a reactor temperature of 1600K, pressure of 10 atm and a 10 sec residence time. This shows that the only significant hydrocarbon remaining is methane at 1% of the carbon mass. A high conversion is achieved with 98% hydrogen (by mole fraction) and 97% of the carbon is solid carbon at the reactor outlet.

TABLE 1

Inlet and outlet carbon balances for reactor at a constant 10 atm and 1600K

|  | Mole Fraction in Gas Phase | Mass Fraction of Carbon |
|---|---|---|
| Inlet |  |  |
| $CH_4$ | 94.75% | 90.97% |
| $CO_2$ | 0.30% | 0.29% |
| $C_2H_6$ | 4.25% | 8.16% |
| $C_3H_8$ | 0.20% | 0.58% |
| $N_2$ | 0.50% | 0.00% |
| Outlet |  |  |
| $CH_4$ | 1.02% | 1.99% |
| $C_2H_2$ | 0.00% | 0.00% |
| $C_2H_4$ | 0.00% | 0.00% |
| $C_2H_6$ | 0.00% | 0.00% |
| CO | 0.31% | 0.61% |
| $CO_2$ | 0.00% | 0.00% |
| $H_2$ | 98.24% | 0.00% |
| $H_2O$ | 0.01% | 0.00% |
| $N_2$ | 0.27% | 0.00% |
| Solid Carbon |  | 97.38% |

Figure 4:
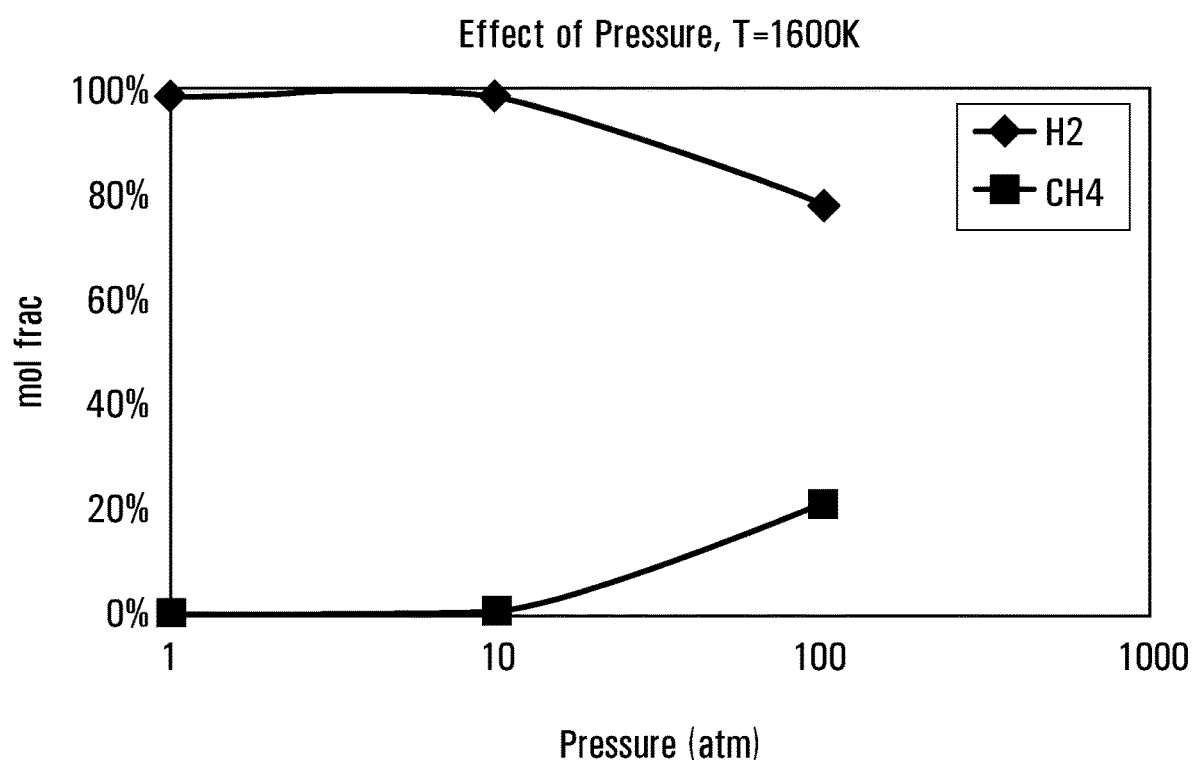
FIG. 4: Graph showing the effect of pressure at 1600K and 10 sec.

FIG. 4 shows the effect of reactor pressure on the outlet mole fractions of methane and hydrogen at reactor temperature of 1600 K and a residence time of 10 sec. The residual methane increases with pressure likely due to the reduction in radicals due to recombination reactions which increase with pressure. Radicals play an important role in methane pyrolysis. The analysis shows that a lower residual methane (0.6%) could be achieved at atmospheric pressure but the reactor volume would need to be ten times larger.

Hydrogen purity between 98% and 100% can be achieved without recycling the residual gases to the pyrolysis unit. However, the purity standard (ISO 14687:2019, "Hydrogen fuel quality—Product specification" November 2019) for PEM fuel cell vehicles is very stringent. For example, carbon monoxide must be below 0.2 ppm which may be challenging depending on the CO and $CO_2$ in the methane source (e.g. natural gas supply) used. Supplying hydrogen for PECFC vehicles may require some purification of the pyrolysis gases in some circumstances, depending on the quality of the methane source.

Figure 5:
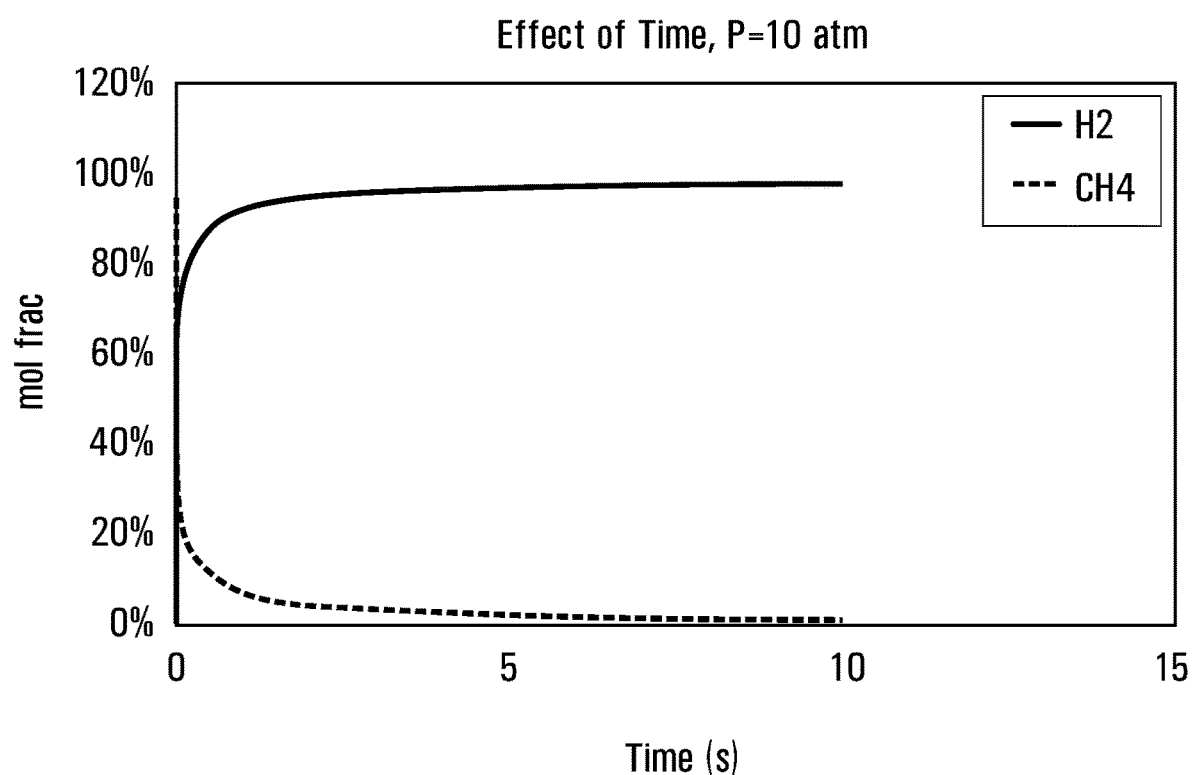
FIG. 5: Graph showing effect of residence time at 1600K and 10 atm.

FIG. 5 shows the effect of reactor residence time on the outlet the outlet mole fractions of methane and hydrogen at a reactor temperature of 1600 K and a pressure of 10 atm. The methane decreases rapidly at first and then flattens out. In the first 0.1 sec, 80% of the methane reacts. Thus, a shorter reactor residence time is possible if one accepts a higher residual methane.

Example 2: Mass and Energy Calculations

Figure 6:
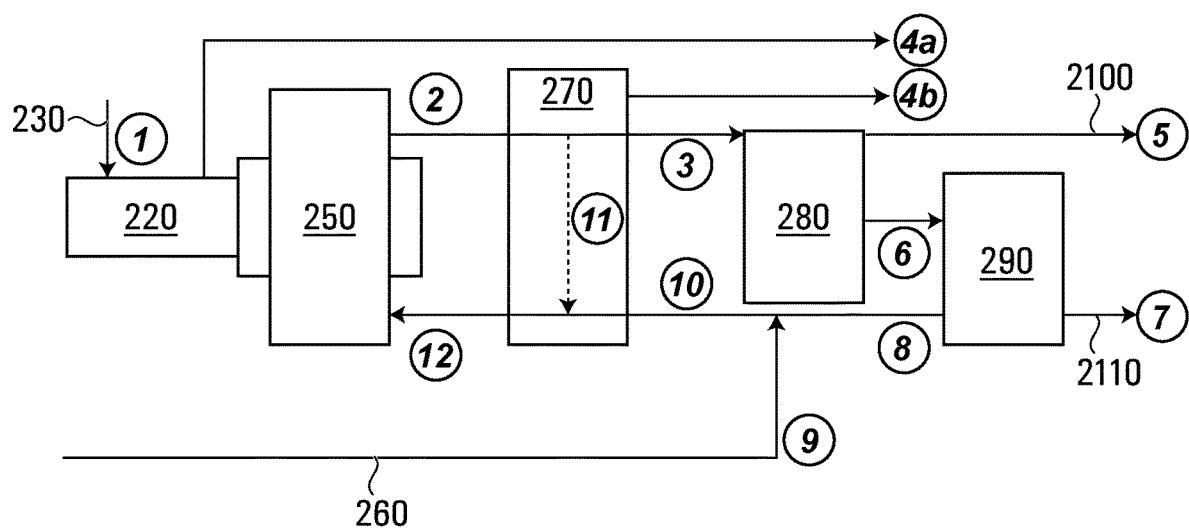
FIG. 6: Schematic of process with locations for energy and mass flow calculations

Using the pyrolysis model as set out in Example 1, it can be predicted that 1% residual methane will remain at the reactor outlet at a reactor pressure of 10 atm, temperature 1600 K and residence time of 10 sec. To simplify the calculations, it has been assumed that the methane source is pure methane. Assuming a reactor inlet temperature of 1100K and that the residual methane is recycled, the increase in total enthalpy through the reactor by unit mass of input methane may be calculated. The amount of heating from the microwaves with a generator efficiency of 90% and a microwave absorption efficiency of 90% can then be calculated. From this, the amount of input methane and outlet hydrogen and solid carbon for a microwave power of 75 kW may then be calculated. The mass and energy flows are summarized in Table 2. FIG. 6 shows the location of the table values. The calculations assume that the heat exchanger can recover 50% of the pyrolysis thermal energy. In FIG. 6, there is an electricity source 230, a microwave generator 220, a methane source 260, a pyrolysis reactor coupled with a microwave cavity 250, a heat exchanger 270, a particle separator 280, a hydrogen separator 290, a solid carbon outflow 2100, and a hydrogen gas outflow 2110.

From the energy and mass flow calculations we predict that our unit consumed 10.6 kWh/kg-$H_2$ (38 MJ/kg-$H_2$) of electricity. This value neglects any fans or pumps and the electricity consumption related to the particle separation and $H_2$ separation.

TABLE 2

Summary of Energy and Mass Flows

| Process Location | Flow | Mass Flow (kg/hour) | Total Energy Flow (kW) | Temperature (K) |
|---|---|---|---|---|
| 1 | Electricity Input | | 75 | |
| 2 | Reactor Outlet | 28.5 | 480 | 1600 |
| 3 | Particle Separator Inlet | 2835 | 434 | 300 |
| 4a | Waste Heat | | 14 | |
| 4b | Waste Heat | | 23 | |
| 5 | Solid Carbon | 21.2 | 193 | 300 |
| 6 | Particle Separator Outlet | 7.3 | 241 | 300 |
| 7 | Hydrogen | 7.1 | 237 | 300 |
| 8 | Residual Methane | 0.3 | 4 | 300 |
| 9 | Methane Input | 28.2 | 392 | 300 |
| 10 | Heat Exchange Methane Inlet | 28.5 | 396 | 300 |
| 11 | Heat Exchanger | | 23 | |
| 12 | Reactor Inlet | 28.5 | 419 | 1100 |

Example 3: Energy Calculations

Assuming the conversion of electricity to microwave energy for a 915 MHz system is 90%, and that the energy absorbed by the carbon is 90%, the transfer of energy to the carbon is estimated to be 81%. The energy requirement across the pyrolysis reactor is 31 MJ/kg $H_2$ and, thus, the total energy requirement is 38 MJ/kg $H_2$. The energy required to make hydrogen by the electrolysis of water is 193 MJ/kg $H_2$ (Bhandari, R., Trudewind, C. A., Zapp, P. (2014) Life cycle assessment of hydrogen production via electrolysis—a review. Journal of Cleaner Production. 85:151-163). Thus, the electricity required to make hydrogen by the microwave pyrolysis process is only 20% of that required to make hydrogen by electrolysis. Note that the balance of plant energy needs is not included.

Example 4: Bench Scale Microwave System

Figure 7:
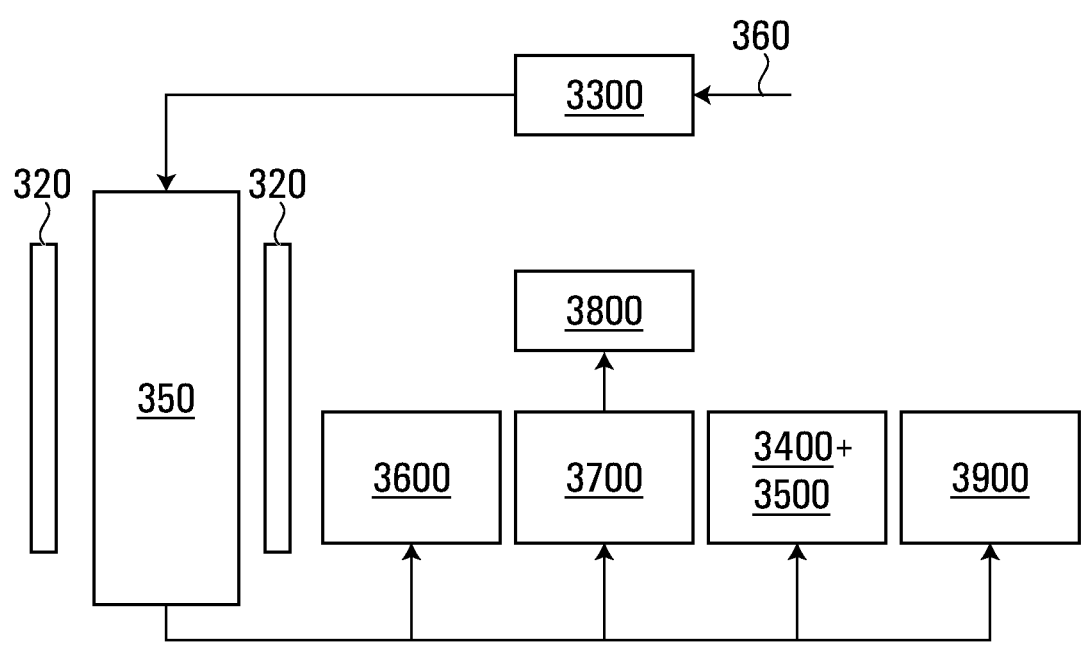
FIG. 7: Schematic of bench scale laboratory experiment.

Laboratory equipment includes microwave systems and reactors of various sizes, configurations, frequency and power. A 3.2 kW 2450 MHz multimode microwave system may be used for the bench scale work and will be integrated into an existing system for studying methane pyrolysis (FIG. 7). Pure methane, or a representative natural gas mixture 360, may be heated by a heater 3300 and introduced into the pyrolysis reactor 350. The reactor 350 may be constructed of microwave-transparent quartz tubing and may sit inside a multi-mode microwave cavity. The microwave system 320 may heat the reactor contents to the desired temperature, which may be measured using an IR camera and type K thermocouple. After exiting the reactor and microwave cavity, the product gas stream containing hydrogen and carbon particles may undergo a series of analyses. The hydrogen yield and hydrocarbon gaseous species remaining in the outlet gases may be measured using a gas chromatography—thermal conductivity detector 3400 (GC-TCD) and gas chromatography—mass spectrometry 3500 (GC-MS), respectively. The amount and size distribution of carbon particles formed may be measured online with a scanning mobility particle sizer 3600 (SMPS) spectrometer. The particle surface properties and morphology may be evaluated using a filter 3700 and extractive sampling and transmission electron microscopy/scanning TEM instruments 3800 (TEM/STEM). The system also comprises a vent 3900.

A larger 15 kW 915 MHz bench-scale system may be used to evaluate the effects of higher power, the industrial frequency, and to compare cavity designs. The 15 kW system may have much the same arrangement as the 3.2 kW except the cavity may be interchangeable, allowing mono or multimode application of microwaves, and may have a tuning feature.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. Furthermore, numeric ranges are provided so that the range of values is recited in addition to the individual values within the recited range being specifically recited in the absence of the range. The word "comprising" is used herein as an open-ended term, substantially equivalent to the phrase "including, but not limited to", and the word "comprises" has a corresponding meaning. As used herein, the singular forms "a", "an" and "the" include plural references unless the context clearly dictates otherwise. Thus, for example, reference to "a thing" includes more than one such thing. Citation of references herein is not an admission that such references are prior art to the exemplary embodiments. Furthermore, material appearing in the background section of the specification is not an admission that such material is prior art to the invention. Any priority document(s) are incorporated herein by reference as if each individual priority document were specifically and individually indicated to be incorporated by reference herein and as though fully set forth herein. The invention includes all embodiments and variations substantially as hereinbefore described and with reference to the examples and drawings.

What is claimed is:

1. A method for preparing hydrogen and solid carbon, the method comprising:
   a) providing a reaction vessel so that the reaction vessel has 0 wt % water and 0 wt % molecular oxygen inside the reaction vessel;
   b) providing a feedstock comprising gaseous hydrocarbons to the reaction vessel, the reaction vessel having a starting solid carbon, 0 wt % water and 0 wt % molecular oxygen inside the reaction vessel, and the starting solid carbon being operable to heat the feedstock comprising gaseous hydrocarbons;
   c) exposing the starting solid carbon in the reaction vessel to microwaves until the starting solid carbon is at a temperature of at least 1200 Kelvin, wherein the starting solid carbon is the primary microwave susceptor;
   d) breaking carbon-hydrogen bonds of the gaseous hydrocarbons of the feedstock by heat transfer between the starting solid carbon and the gaseous hydrocarbons, thereby forming hydrogen and a prepared solid carbon in the reaction vessel; and
   e) separating the hydrogen and the prepared solid carbon,
wherein the reaction vessel is microwave inert; and
wherein the method is conducted in a single-reactor system, wherein the single reactor is the reaction vessel.

2. The method of claim 1 wherein the reaction vessel comprises microwave transparent materials.

3. The method of claim 1 wherein the reaction vessel comprises microwave reflective materials.

4. The method of claim 1 wherein the reaction vessel is made from quartz and a high temperature metal alloy.

5. The method of claim 1 wherein the feedstock is natural gas.

6. The method of claim 1 wherein the feedstock is a gaseous feedstock.

7. The method of claim 1 wherein the feedstock is substantially devoid of non-hydrocarbon gases.

8. The method of claim 1 wherein the feedstock contains 0 wt % of an inert gas.

9. The method of claim 1 wherein the feedstock consists essentially of gaseous hydrocarbons.

10. The method of claim 1 wherein the prepared solid carbon is solid carbon produced by pyrolysis of gaseous hydrocarbons.

11. The method of claim 1 wherein, after exposing the starting solid carbon in the reaction vessel to microwaves, the starting solid carbon is at a temperature in the range of from 1200 Kelvin to about 2000 Kelvin or the starting solid carbon and the prepared solid carbon is at a temperature range of from 1200 Kelvin to about 2000 Kelvin.

12. The method of claim 1 wherein, after exposing the starting solid carbon in the reaction vessel to microwaves, the starting solid carbon is at a temperature in the range of from about 1300 Kelvin to about 1900 Kelvin, or the starting solid carbon and the prepared solid carbon is at a temperature in the range of from about 1300 Kelvin to about 1900 Kelvin.

13. The method of claim 1 wherein, after exposing the starting solid carbon in the reaction vessel to microwaves, the starting solid carbon is at a temperature in the range of from about 1400 Kelvin to about 1800 Kelvin, or the starting solid carbon and the prepared solid carbon is at a temperature in the range of from about 1400 Kelvin to about 1800 Kelvin.

14. The method of claim 1 wherein, after exposing the starting solid carbon in the reaction vessel to microwaves, the starting solid carbon is at a temperature in the range of from about 1500 Kelvin to about 1700 Kelvin, or the starting solid carbon and the prepared solid carbon is at a temperature in the range of from about 1500 Kelvin to about 1700 Kelvin.

15. The method of claim 1 wherein, after exposing the starting solid carbon in the reaction vessel to microwaves, the starting solid carbon is at a temperature of about 1600 Kelvin, or the starting solid carbon and the prepared solid carbon is at a temperature of about 1600 Kelvin.

16. The method of claim 1 wherein the method does not use a catalyst.

17. The method of claim 1 wherein the hydrogen and the prepared solid carbon are produced in the absence of plasma formation by the microwaves.

18. The method of claim 1 wherein the starting solid carbon is free of metal impurities and oxygen-containing species.

19. The method of claim 1 wherein the hydrogen and the prepared solid carbon are formed without substantial formation of carbon monoxide.

20. The method of claim 1 wherein the feedstock has less than or equal to 2 wt % water.

* * * * *